US009103042B2

(12) United States Patent
Wang et al.

(10) Patent No.: US 9,103,042 B2
(45) Date of Patent: Aug. 11, 2015

(54) ELECTROCHEMICAL SYNTHESIS TO PRODUCE LUBE STOCK FROM RENEWABLE FEEDS

(71) Applicant: ExxonMobil Research and Engineering Company, Annandale, NJ (US)

(72) Inventors: Kun Wang, Bridgewater, NJ (US); Liena Tan, Madison, WI (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 74 days.

(21) Appl. No.: 13/788,604

(22) Filed: Mar. 7, 2013

(65) Prior Publication Data
US 2014/0257002 A1 Sep. 11, 2014

(51) Int. Cl.
C25B 1/00 (2006.01)
C25B 3/04 (2006.01)
C25B 3/10 (2006.01)
C25B 3/02 (2006.01)
C10G 3/00 (2006.01)

(52) U.S. Cl.
CPC ... *C25B 3/10* (2013.01); *C10G 3/00* (2013.01); *C25B 3/02* (2013.01)

(58) Field of Classification Search
CPC ........ C07C 15/08; C07C 15/02; C07C 6/123; C07C 6/126; C07C 5/2724; C07C 255/00; C07C 37/055; C07C 37/66; C07C 39/235; C25B 1/00; C25B 15/00; C25B 1/26; C25B 1/46; C25B 3/04; C25B 3/02; C25B 5/00; C25B 3/10; C25B 3/105; C25B 3/00; C25C 1/12; B01D 53/326; B01D 67/0041; C07F 9/4025; H01B 1/127; H01B 1/128; H01M 4/60; C08G 61/10; Y02E 60/12
USPC .......... 585/321; 205/462, 342, 415, 418, 419; 549/274, 512
See application file for complete search history.

(56) References Cited

U.S. PATENT DOCUMENTS 4,018,844 A 4/1977 Meresz et al.
7,582,777 B2 * 9/2009 Bloom .......................... 549/274
2006/0288638 A1 * 12/2006 Schwab .......................... 44/412

(Continued)

FOREIGN PATENT DOCUMENTS

WO 2007027669 A1 3/2007
WO WO 2007027669 A1 * 3/2007
WO 2007068797 A2 6/2007

OTHER PUBLICATIONS

Svadkofskaya, G. E.; Voitkevich, S. A. Rus. Chem. Rev., 1960, 29, 161-180.*

(Continued)

*Primary Examiner* — In Suk Bullock
*Assistant Examiner* — Aaron Pierpont
(74) *Attorney, Agent, or Firm* — Robert A. Migliorini

(57) ABSTRACT

Provided are processes for producing a lube basestock or wax from a feedstock of biological origin, the method including: providing a fatty acid originated from the feedstock of biological origin and an aromatic acid in a solvent comprising a base; and electrically coupling the fatty acid and the aromatic acid to produce a hydrocarbon, wherein the molar concentration of the fatty acid is greater than the molar concentration of the aromatic acid.

20 Claims, 8 Drawing Sheets

(56) References Cited

U.S. PATENT DOCUMENTS

| | | | |
|---|---|---|---|
| 2007/0161832 A1* | 7/2007 | Myllyoja et al. | 585/7 |
| 2010/0160506 A1 | 6/2010 | Wu et al. | |
| 2011/0111475 A1* | 5/2011 | Kuhry et al. | 435/166 |
| 2011/0168569 A1* | 7/2011 | Bhavaraju et al. | 205/462 |
| 2011/0226633 A1 | 9/2011 | Bhavaraju et al. | |
| 2013/0017590 A1 | 1/2013 | Chung et al. | |

OTHER PUBLICATIONS

Schäfer, H. J. "Recent Contributions of Kolbe Electrolysis to Organic Synthesis", Topics in Current Chemistry; Steckhan, E., Ed.; Springer-Verlag: Berlin, 1990; vol. 152, 91-150.*

Deldari, H., Applied Catal. A. 2005, 293, 1-10.*

Furniss, B. S.; Hannaford, A. J.; Smith, P. W. G.; Tatchell, A. R. Vogel's Textbook of Practical Organic Chemistry; John Wiley & Sons: New York, 1989; p. 484.*

A. Weiper-Idelmann, M. Aus Dem Kahmen, H.J. Schafer, M. Gockeln, "Electrochemical Synthesis 65: Anodic Homocoupling of Carboylic Acids Derived from Fatty Acids", Acta Chemica Scandinavica, 52 (1998), 672-682.

Jerry March, "Advanced Organic Chemistry—Reactions, Mechanisms and Structure", Fourth Edition, Jon Wiley & Sons, Inc., 1992, 729-730.

Renz, Michael, "Ketonization of Carboxylic Acids by Decarboxylation: Mechanism and Scope," European Journal of Organic Chemistry, 2005, Issue 6, pp. 979-988.

The International Search Report and Written Opinion of PCT/US2014/015199 dated Mar. 23, 2015.

* cited by examiner

ELECTROCHEMICAL SYNTHESIS TO PRODUCE LUBE STOCK FROM RENEWABLE FEEDS

FIELD

The present disclosure relates to improved methods for producing lube stock and/or wax from renewable feed sources and lube basestock produced by the methods. More specifically, this disclosure relates to methods of electrochemical synthesis to produce lube basestock and/or wax from renewable feed sources.

BACKGROUND

Lube basestocks are commonly used for the production of lubricants, such as lubricating oils for automobiles, industrial lubricants and lubricating greases. They are also used as process oils, white oils, metal working oils and heat transfer fluids. Finished lubricants consist of two general components, lubricating base oil and additives. Lubricating base oil is the major constituent in these finished lubricants and contributes significantly to the properties of the finished lubricant. In general, a few lubricating base oils are used to manufacture a wide variety of finished lubricants by varying the mixtures of individual lubricating base oils and individual additives.

According to the American Petroleum Institute (API) classifications, lube basestocks are categorized in five groups based on their saturated hydrocarbon content, sulfur level, and viscosity index (Table 1). Lube base oils are typically produced in large scale from non-renewable petroleum sources. Group I, II, and III basestocks are all derived from crude oil via extensive processing, such as solvent extraction, solvent or catalytic dewaxing, and hydroisomerization. Group III base oils can also be produced from synthetic hydrocarbon liquids obtained from natural gas, coal or other fossil resources. Group IV basestocks, the poly (alpha olefins) (PAO), are produced by oligomerization of alpha olefins, such as 1-decene. Group V base oils include everything that does not belong to Groups I-IV, such as naphthenics, polyalkylene glycols (PAG) and esters.

TABLE 1

| | API classification | | | | |
|---|---|---|---|---|---|
| | Group I | Group II | Group III | Group IV | Group V |
| % Saturates | <90 | ≥90 | ≥90 | Poly alpha-olefins (PAO) | All others not belonging to Group I-IV |
| % S | >0.03 | ≤0.03 | ≤0.03 | | |
| Viscosity Index (VI) | 80-120 | 80-120 | ≥120 | | |

Natural oils derived from biological sources are sometimes used as lubricants, but to a small scale, due to their poor low-temperature properties and hydrolysis instability. The triglyceride esters in natural oils are often hydrolyzed to yield fatty acids, which can be subsequently converted into esters as synthetic lubricants.

For environmental, economical, and regulatory reasons, it is of interest to produce fuels, chemicals, and lube oils from renewable sources of biological origin. So far only esters of renewable and biological origin have been used in applications such as refrigeration compressor lubricants, bio-hydraulic oils and metal working oils. In automotive and industrial lubricants, esters from biological sources are used in very small fractions as additives due to technical problems as well as their high prices. For example, ester base oils can hydrolyze readily producing acids, which in turn cause corrosion on lubricating systems.

In contrast, lube basestocks consisting of hydrocarbons from biological sources do not have those technical problems associated with esters from same sources. Most common biological sources for hydrocarbons are natural oils, which can be derived from plant sources such as canola oil, castor oil, sunflower seed oil, rapeseed oil, peanut oil, soy bean oil, and tall oil, or derived from animal fats. The basic structural unit of natural oils and fats is a triglyceride, which is an ester of glycerol with three fatty acid molecules having the structure below:

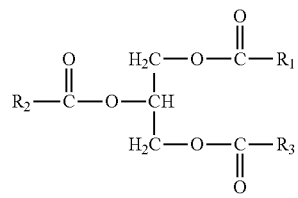

wherein $R_1$, $R_2$, and $R_3$ represent $C_4$-$C_{30}$ hydrocarbon chains. Fatty acids are carboxylic acids containing long linear hydrocarbon chains. Lengths of the hydrocarbon chains most commonly are 18 carbons ($C_{18}$). $C_{18}$ fatty acids are typically bonded to the middle hydroxyl group of glycerol. Typical carbon numbers of the fatty acids linked to the two other hydroxyl groups are even numbers, being between $C_{14}$ and $C_{22}$.

In the field of fuels, so-called renewable source components are now required both in the US and Europe. Although there is no imminent requirement for lube products currently, generating premium basestocks from renewable sources on a large scale is attractive for the same policy reasons that led to the imposition of regulations in the higher volume fuel area. In fact, with recent advances in biofuels, natural oils are becoming increasingly available as feedstocks that provide fuel value comparable to that of petroleum oils. Converting these bio-feeds to lubes can give significant value uplift.

Kolbe reaction is one of the oldest and best-known electro-organic reactions and is defined as one-electron oxidation of carboxylate ions RCOO— with decarboxylation that leads to a radical R.. These radicals can dimerize to form a larger molecule R—R (Kolbe coupling). The overall reaction is summarized as follows:

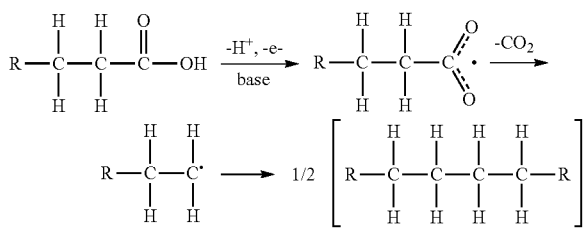

Weiper-Idelmann et al, *Acta Chemica Scandinavica* 52 (1998) pp. 672-682 report dimerization of fatty acids having long chain hydrocarbons by Kolbe electro-coupling. Cross-coupling can also occur in the co-electrolysis of two different acids.

U.S. Pat. No. 7,582,777 to Bloom (issued on Sep. 1, 2009) describes a method for producing long chain ($C_{22}$-$C_{50}$) polyunsaturated hydrocarbons via electro-coupling of $C_{12}$-$C_{26}$ fatty acids.

However, it is known that Kolbe electrochemical coupling is unsuccessful when an arylic acid is used (see Jerry March, *Advanced Organic Chemistry—Reactions, Mechanisms and Structure, fourth edition*, John Wiley & Sons, Inc. 4$^{th}$ Ed. (1992), pp. 729-730).

It is surprisingly found that, by proper choice of solvents, bases, and a fatty acid to arylic acid ratio, homo-coupling of arylic acids such as phenylacetic acid and cross-coupling of arylic acids with fatty acids are feasible electrochemically.

SUMMARY

The present disclosure relates to a process for producing a lube base stock and/or wax from a feedstock derived from natural oil. There is provided a method for producing a lube basestock and/or wax from a feedstock of biological origin, the method comprising: providing a fatty acid originated from the feedstock of biological origin and an aromatic acid in a solvent comprising a base; and electrochemically coupling the fatty acid and the aromatic acid to produce a hydrocarbon, wherein the molar concentration of the fatty acid is greater than the molar concentration of the aromatic acid.

In another embodiment, there is provided a method for producing a lube basestock and/or wax from a feedstock of biological origin in a single reactor, the method comprising: hydrolyzing a triglyceride in the feedstock of biological origin to one or more fatty acids in the presence of water, wherein the amount of the water is controlled to be substantially consumed during the hydrolyzing reaction; and electrochemically coupling the fatty acids in a solvent comprising a base to produce a hydrocarbon, wherein the base is provided not to be mixed with the triglyceride in the hydrolyzing reaction.

In yet another embodiment, there is provided a method for producing a lube basestock and/or wax from a feedstock of biological origin, the method comprising: providing a fatty acid and a di- or tri-carboxylic acid selected from the group consisting of malonic acid, succinic acid, glutaric acid, adipic acid, pimelic acid, suberic acid, sebacic acid, citric acid, isocitric acid, aconitic acid, propane-1,2,3-tricarboxylic acid, and trimesic acid; and electrochemically coupling acids to produce a hydrocarbon, wherein a molar ratio of the carboxylic acid to the fatty acid is in a range of 1:5 to 1:20.

DETAILED DESCRIPTION

All numerical values within the detailed description and the claims herein are modified by "about" or "approximately" the indicated value, and take into account experimental error and variations that would be expected by a person having ordinary skill in the art.

Lube basestocks have been conventionally produced from petroleum feedstocks via extensive processing. Recent attention has been given to processing renewable feeds for fuel production. Many natural oils contain triglycerides with fatty acid chains of predominantly 18 carbon number, which fit into the diesel boiling range. Prior efforts, however, focused primarily on production of biodiesel or renewable diesel from natural oils. Thus, it would be advantageous to provide a method for producing lube basestocks.

Figure 1:
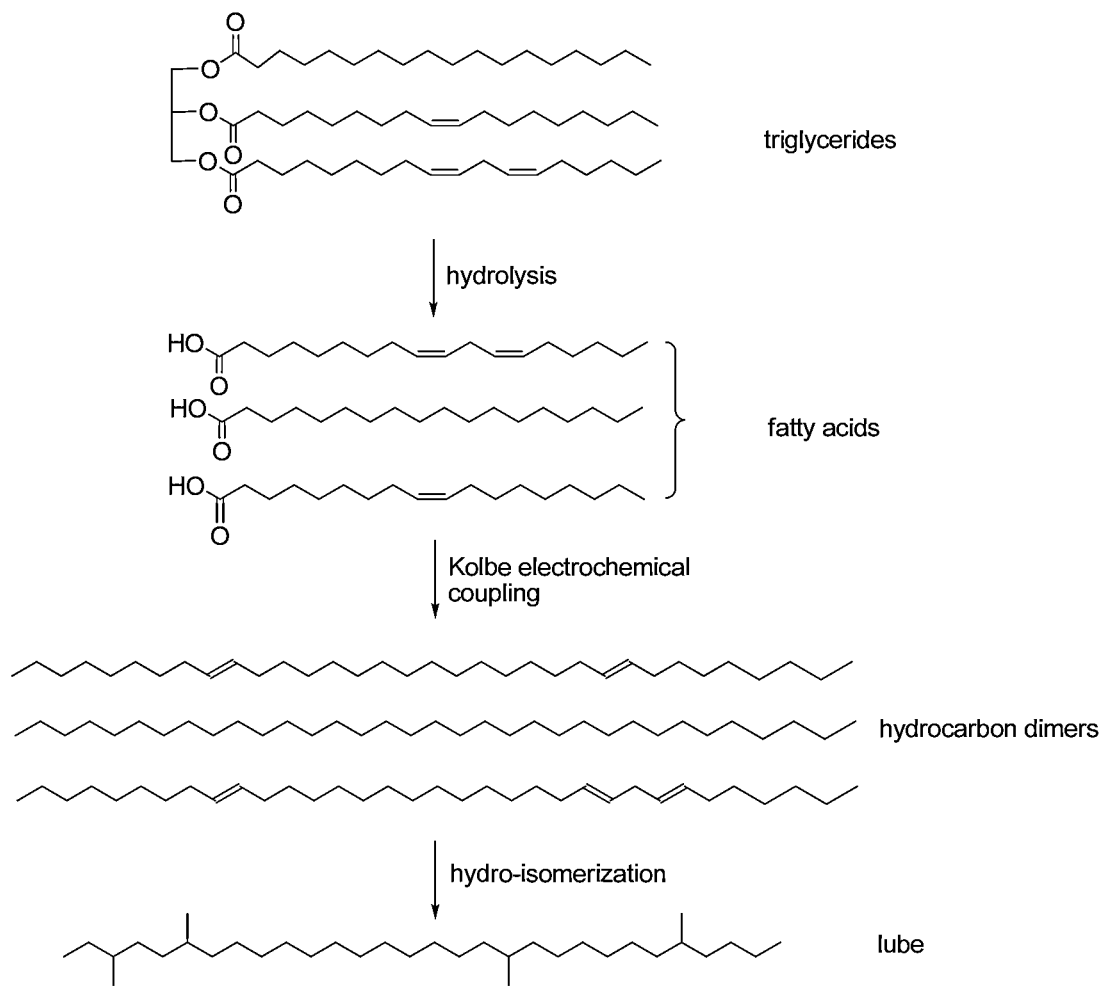
FIG. 1 is a scheme illustrating reactions for producing lube basestocks from renewable sources such as triglycerides.

The present disclosure relates to a process for producing lube basestock and/or wax from a feedstock derived from natural oils. The methods described herein involve, for example, hydrolysis of natural fats forming fatty acids; and electrochemical coupling (e.g., Kolbe coupling) of fatty acids and/or aromatic acids to produce long chain hydrocarbons, as shown in FIG. 1. The methods may further comprise various further processing steps such as hydro-isomerization of the long chain hydrocarbons to lubes or hydrogenation of the long chain hydrocarbons to waxes.

In anodic coupling of carboxylic acid (Kolbe coupling), a carboxylic group is oxidized giving radical in the presence of a base (e.g., sodium methoxide), which quickly releases $CO_2$ forming an alkyl radical. Coupling of the alkyl radical gives a long chain hydrocarbon by combining the backbone of the starting carboxylic acid. Kolbe coupling is flexible and works with both saturated and unsaturated fatty acids and their mixtures. It is known that fatty esters cannot be couple electrochemically. It is surprisingly found that esters such as triglycerides can be used for electrochemical coupling after proper hydrolysis to fatty acids.

Advantages of anodic decarboxylation compared with non-electrochemical radical homo-coupling reactions include simple reaction condition, low electricity cost, easy scale-up, and readily-available starting compounds (carboxylic acids). Other decarboxylation reactions, such as Barton decarboxylation and Hunsdiecker reaction, tend to leave an undesirable functional group in the products.

Figure 2:
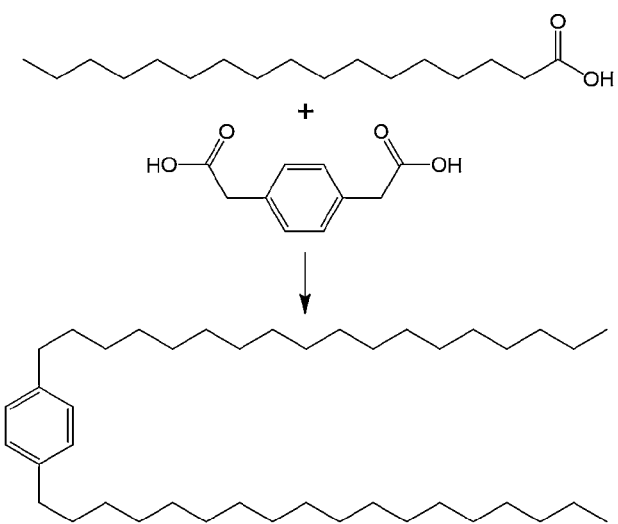
FIG. 2 is a scheme illustrating reactions for producing lube basestocks from a fatty acid and an aromatic acid.

In an embodiment, the present disclosure provides a method for producing a lube basestock or wax from a feedstock of biological origin, the method comprising: providing a fatty acid originated from the feedstock of biological origin and an aromatic acid in a solvent comprising a base; and electrochemically coupling the fatty acid and the aromatic acid to produce a hydrocarbon, wherein the molar concentration of the fatty acid is greater than the molar concentration of the aromatic acid. The method is advantageous in that the presence of aromatics in basestocks improves its solvency. An example of Kolbe coupling of an aromatic acid and a fatty acid is illustrated in FIG. 2.

Figure 4:
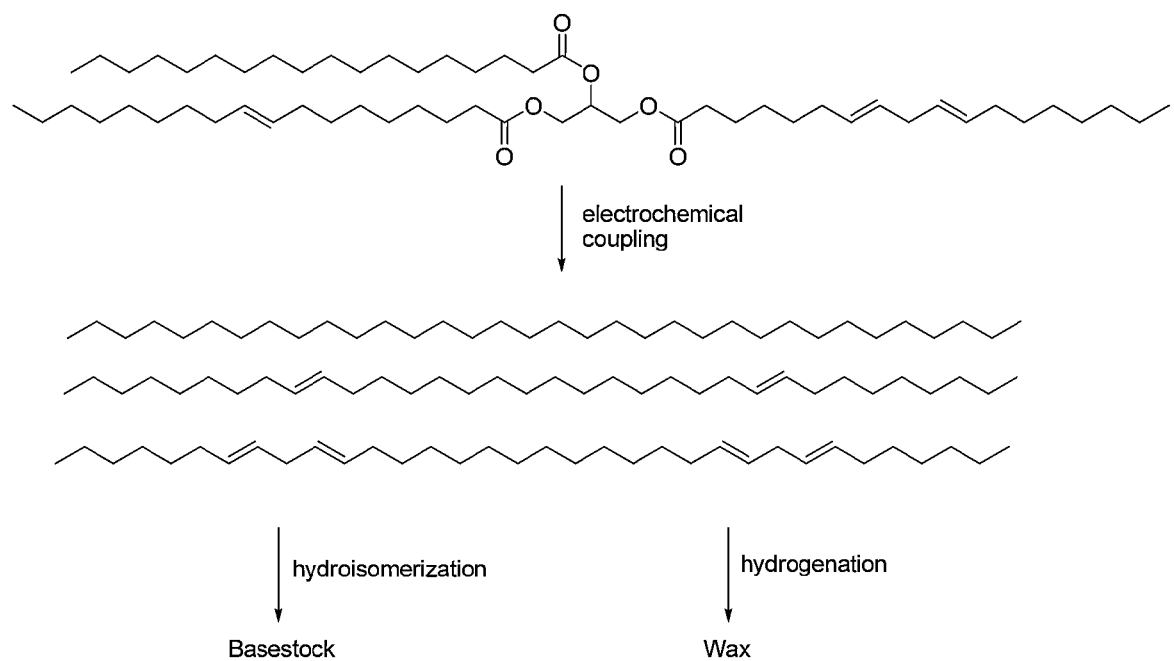
FIG. 4 is a scheme illustrating a one-pot conversion of triglycerides to produce lube basestocks and/or wax.

In another embodiment, there is provided a method for producing a lube basestock or wax from a feedstock of biological origin in a single reactor, the method comprising: hydrolyzing a triglyceride in the feedstock of biological origin to one or more fatty acids in the presence of water, wherein the amount of the water is controlled to be substantially consumed during the hydrolyzing reaction; and electrochemically coupling the fatty acids in a solvent comprising a base to produce a hydrocarbon, wherein the base is provided not to be mixed with the triglyceride in the hydrolyzing reaction. This method can be carried out in a single reactor, i.e., one-pot conversion, as illustrated in FIG. 4.

In yet another embodiment, there is provided a method for producing a lube basestock or wax from a feedstock of biological origin, the method comprising: providing a fatty acid and a carboxylic acid selected from the group consisting of malonic acid, succinic acid, glutaric acid, adipic acid, pimelic acid, suberic acid, sebacic acid, citric acid, isocitric acid, aconitic acid, propane-1,2,3-tricarboxylic acid, and trimesic acid; and electrochemically coupling acids to produce a hydrocarbon, wherein a molar ratio of the carboxylic acid to the fatty acid is in a range of 1:5 to 1:20.

Figure 3:
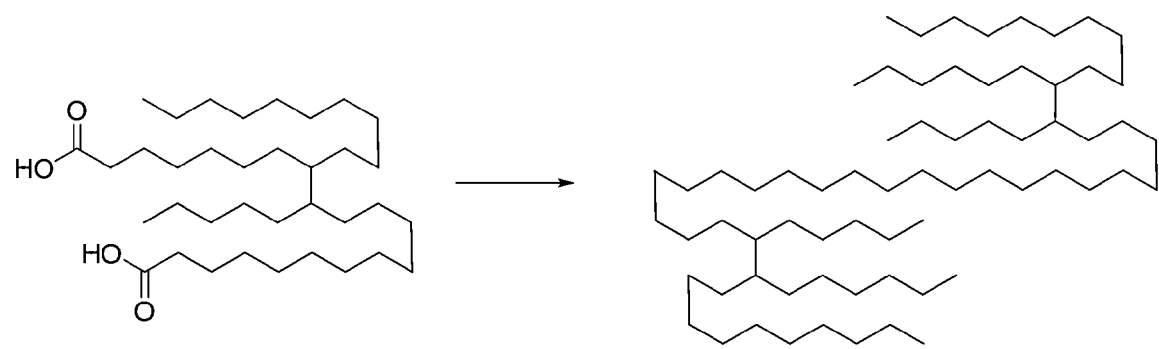
FIG. 3 is a scheme illustrating reactions for producing lube basestocks from a dimer acid.

In yet another embodiment, there is provided a method for producing a lube basestock or wax from a feedstock of biological origin, the method comprising: providing one or more dimeric acids. The coupling would give a larger hydrocarbon molecule having 70 carbons as illustrated in FIG. 3. Stearic acid may be added as a capping agent, providing larger molecules.

In various embodiments, the methods for producing a lube basestock or wax described herein may further comprises hydrolyzing a triglyceride originated from the feedstock of biological origin to produce a fatty acid. Methods for hydrolyzing a triglyceride are well known in the art, and any of such conventional methods can be used in the methods describes herein. Also, the methods may further comprises various further processing steps, such as hydroisomerizing or cracking the hydrocarbon to produce lube basestock, and hydrogenation step to produce wax.

Feedstocks

Feedstocks for the process are drawn either from petroleum sources or from renewable sources of biological origin, e.g., plant, algae or animal (including insect) origin. Animal, algae and plant oils containing tri-glycerides, as well as partially processed oils containing mono-glycerides and di-glycerides are included in this group. Another source of feedstock is phospholipids or saccharolipids containing fatty acid esters in their structure, such as phosphatidyl choline and the like present in plant cell walls. Carbon numbers for the fatty acid component of such feedstocks are generally in the range of $C_{12}$ or greater, up to $C_{30}$.

Other components of the feed can include a) plant fats, plant oils, plant waxes; animal fats, animal oils, animal waxes; fish fats, fish oils, fish waxes, and mixtures thereof; b) free fatty acids or fatty acids obtained by hydrolysis, acid trans-esterification or pyrolysis reactions from plant fats, plant oils, plant waxes, animal fats, animal oils, animal waxes, fish fats, fish oils, fish waxes, and mixtures thereof; c) esters obtained by trans-esterification from plant fats, plant oils, plant waxes, animal fats, animal oils, animal waxes, fish fats, fish oils, fish waxes, and mixtures thereof, d) esters obtained by esterification of free fatty acids of plant, animal and fish origin with alcohols, and mixtures thereof; e) fatty alcohols obtained as reduction products of fatty acids from plant fats, plant oils, plant waxes, animal fats, animal oils, animal waxes, fish fats, fish oils, fish waxes, and mixtures thereof; and f) waste and recycled food grade fats and oils, and fats, oils and waxes obtained by genetic engineering, and mixtures thereof.

Examples of vegetable oils that can be used in accordance with this disclosure include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil. Vegetable oils as referred to herein can also include processed vegetable oil material as a portion of the feedstock. Non-limiting examples of processed vegetable oil material include fatty acids and fatty acid alkyl esters. Alkyl esters typically include $C_1$-$C_5$ alkyl esters. One or more of methyl, ethyl, and propyl esters are desirable.

Examples of animal fats that can be used in accordance with the disclosure include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include $C_1$-$C_5$ alkyl esters. In particular embodiments, alkyl esters are one or more of methyl, ethyl, and propyl esters.

Algae oils or lipids can typically be contained in algae in the form of membrane components, storage products, and/or metabolites. Certain algal strains, particularly microalgae such as diatoms and cyanobacteria, can contain proportionally high levels of lipids. Algal sources for the algae oils can contain varying amounts, e.g., from 2 wt % to 40 wt % of lipids, based on total weight of the biomass itself.

Algal sources for algae oils can include, but are not limited to, unicellular and multicellular algae. Examples of such algae can include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis carterae, Prymnesium parvum, Tetraselmis chui*, and *Chlamydomonas reinhardtii*. Additional or alternate algal sources can include one or more microalgae of the *Achnanthes, Amphiprora, Amphora, Ankistrodesmus, Asteromonas, Boekelovia, Borodinella, Botryococcus, Bracteococcus, Chaetoceros, Carteria, Chlamydomonas, Chlorococcum, Chlorogonium, Chlorella, Chroomonas, Chrysosphaera, Cricosphaera, Crypthecodinium, Cryptomonas, Cyclotella, Dunaliella, Ellipsoidon, Emiliania, Eremosphaera, Ernodesmius, Euglena, Franceia, Fragilaria, Gloeothamnion, Haematococcus, Halocafeteria, Hymenomonas, Isochrysis, Lepocinclis, Micractinium, Monoraphidium, Nannochloris, Nannochloropsis, Navicula, Neochloris, Nephrochloris, Nephroselmis, Nitzschia, Ochromonas, Oedogonium, Oocystis, Ostreococcus, Pavlova, Parachlorella, Pascheria, Phaeodactylum, Phagus, Platymonas, Pleurochrysis, Pleurococcus, Prototheca, Pseudochlorella, Pyramimonas, Pyrobotrys, Scenedesmus, Skeletonema, Spyrogyra, Stichococcus, Tetraselmis, Thalassiosira, Viridiella*, and Vo/vox species, and/or one or more cyanobacteria of the *Agmenellum, Anabaena, Anabaenopsis, Anacystis, Aphanizomenon, Arthrospira, Asterocapsa, Borzia, Calothrix, Chamaesiphon, Chlorogloeopsis, Chroococcidiopsis, Chroococcus, Crinalium, Cyanobacterium, Cyanobium, Cyanocystis, Cyanospira, Cyanothece, Cylindrospermopsis, Cylindrospermum, Dactylococcopsis, Dermocarpella, Fischerella, Fremyella, Geitleria, Geitlerinema, Gloeobacter, Gloeocapsa, Gloeothece, Halospirulina, Iyengariella, Leptolyngbya, Limnothrix, Lyngbya, Microcoleus, Microcystis, Myxosarcina, Nodularia, Nostoc, Nostochopsis, Oscillatoria, Phormidium, Planktothrix, Pleurocapsa, Prochlorococcus, Prochloron, Prochlorothrix, Pseudanabaena, Rivularia, Schizothrix, Scytonema, Spirulina, Stanieria, Starria, Stigonema, Symploca,*

*Synechococcus, Synechocystis, Tolypothrix, Trichodesmium, Tychonema*, and *Xenococcus* species.

Other feeds usable in the present disclosure can include any of those that comprise primarily triglycerides and free fatty acids (FFAs). The triglycerides and FFAs typically contain aliphatic hydrocarbon chains in their structure having from 8 to 36 carbons, particularly from 10 to 26 carbons, for example from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material is made of $C_{10}$ to $C_{26}$ fatty acid constituents, based on total triglyceride present in the lipid material. Further, a triglyceride is a molecule having a structure identical to the reaction product of glycerol and three fatty acids. Thus, although a triglyceride is described herein as being comprised of fatty acids, it should be understood that the fatty acid component does not necessarily contain a carboxylic acid hydrogen. If triglycerides are present, a majority of triglycerides present in the feed can particularly be comprised of $C_{12}$ to $C_{22}$ fatty acid constituents, based on total triglyceride content. Other types of feed that are derived from biological raw material components can include fatty acid esters, such as fatty acid alkyl esters (e.g., FAME and/or FAEE).

For reactions with feedstocks having a relatively higher degree of unsaturation, an acidic catalyst can be used to promote dimerization and oligomerization. The dimers and oligomers are branched or having cyclic structures, which can be coupled with another carboxylic acid electrochemically forming coupled products of higher carbon numbers. Subsequent hydrogenation under the action of the hydrogenation catalyst produces saturated, branched or cyclized hydrocarbons than can be naturally very low in wax and require little if any dewaxing.

One method for characterizing the triglycerides in a feedstock is based on the number of carbons in the side chains. While some feedstocks may have consistent numbers of carbons in each side chain, such as in a tristearin feedstock, many types of triglycerides will have variations in chain length between molecules and even within molecules. In order to characterize these variations, the average number of carbons per side chain in the triglycerides can be determined. By definition, a triglyceride contains three side chains. Each side chain contains a number of carbons, as mentioned above. By averaging the number of carbons in each side chain for the triglycerides in a feedstock, an average side chain length can be determined. The average number of carbons (also referred to as average carbon number) per side chain in the feedstock can be used as a comparative value for characterizing products. For example, the average number of carbons per side chain in the feedstock can be compared with the average number of carbons in hydrocarbons generated by converting and/or isomerizing the triglyceride-containing feedstock.

With regard to triglyceride content, the feedstock can include at least 10 wt %, such as at least 25 wt %, and particularly at least 40 wt %, or at least 60 wt %, or at least 80 wt %. Additionally or alternatively, the feed can be composed entirely of triglycerides, or the triglyceride content of the feed can be 90 wt % or less, such as 75 wt % or less, or 50 wt % or less. The methods described herein are suitable for conversion of triglycerides to lubricant products, so higher contents of triglycerides may be advantageous.

Biocomponent based feedstreams have a wide range of nitrogen and/or sulfur contents depending on the feed sources. For example, a feedstream based on a vegetable oil source can contain up to 300 wppm nitrogen. In some embodiments, the sulfur content can be 500 wppm or less, for example 100 wppm or less, 50 wppm or less, or 10 wppm or less, where wppm stands for parts per million by weight.

In an embodiment, the feedstock of biological origin is selected from the group consisting of rapeseed oil, soy bean oil, palm oil, camelina oil, jatropha oil, jojoba oil, fish oil, lard, beef tallow, and algae oil.

In another embodiment, fatty acid is selected from caprylic acid, capric acid, lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, α-Linolenic acid, arachidonic acid, eicosapentaenoic acid, erucic acid, docosahexaenoic acid and a mixture thereof. In a particular embodiment, the fatty acid is selected from lauric acid, myristic acid, palmitic acid, stearic acid, arachidic acid and a mixture thereof.

In an embodiment, the aromatic acid includes phenylacetic acid, phenylenediacetic acid, naphthaleneacetic acid, 1,4-naphthalenedicarboxylic acid, 2,3-naphthalenedicarboxylic acid, 2,6-naphthalenedicarboxylic acid or a mixture thereof. In a particular embodiment, the aromatic acid is selected from phenylacetic acid, phenylenediacetic acid, naphthaleneacetic acid and a mixture thereof.

The present inventor found that controlling a molar ratio of an aromatic acid to a fatty acid may be useful to promote a reaction of the electrochemical coupling of the aromatic acid and the fatty acid. Therefore, in an embodiment, a molar ratio of an aromatic acid to a fatty acid is controlled to be in a range of 1:5 to 1:20. In a particular embodiment, a molar ratio of the aromatic acid to the fatty acid is controlled to be in a range of 1:7 to 1:13.

Likewise, controlling a molar ratio of a di- or tri-carboxylic acid to a fatty acid may be useful to promote a reaction of the electrochemical coupling. Therefore, in an embodiment, a molar ratio of a di- or tri-carboxylic acid to a fatty acid is controlled to be in a range of 1:5 to 1:20. In a particular embodiment, a molar ratio of the carboxylic acid to the fatty acid is controlled to be in a range of 1:7 to 1:13.

Reaction Conditions and Process Configurations

Properties that are ideal for electrolysis (i.e., polar) are not suitable with that required to solubilize Kolbe products (i.e., non-polar), and thus, a mixture of polar and non-polar solvent can be used. The solvent for an electrochemical reaction of this disclosure can be selected from, for example, methanol, pentane, hexane, heptane, octane, nonane, decane, undecane, dodecane, toluene, xylene, acetonitrile, dimethylformamide, 4-methylmorpholine and a mixture thereof. A base can be added to the solvent since addition of a base generates fatty acid salts that improve the conductivity. The base for an electrochemical reaction of this disclosure can be selected from, for example, sodium methoxide and amines of primary ($H_2NR$), secondary ($HNR_1R_2$), or tertiary ($NR_1R_2R_3$) in nature, where R, $R_1$, $R_2$ and $R_3$ are the same or different and are independently selected from hydrocarbyl group containing more than 2 carbon atoms where the hydrocarbyl group can be acyclic or cyclic. In a particular embodiment, the solvent comprises methanol and sodium methoxide. Other protic solvents such as ethanol, 1- or 2-propanol; aprotic solvents such as nitromethane can be used. In another particular embodiment, the solvent comprises methanol and N,N-dimethylcyclohexylamine.

The electrochemical coupling is carried out by applying direct current (DC) with voltages sufficient to maintain current of at least 1 mA. In an embodiment, the coupling reaction is carried out by reversing voltage of the DC during the electrochemical coupling process. The reaction can be carried out either in batch or continuous mode. When carrying out in a continuous mode, the reaction mixture is continuously flowing through a pair of electrodes with narrow gap (<1 mm) held at desired voltage to maintain current flow. To scale up the process, a series of the narrow gap electrochemical reactors (cells) can be stacked either in parallel or in series. The reservoir holding the reaction mixture optionally can be heated at desired temperature, e.g., 40° C. to 100° C. to maintain solubility.

Further Processing

The product of the reaction described herein, if desired, can be hydrofinished by subjecting it to low pressure hydrogen over a hydrofinishing catalyst. This process can clean up residual oxygenates and olefinic unsaturates that may result when the products are being heated in the presence of the hydrogenation catalyst, which can have cracking functionality given that it may contain an acidic carrier such as a zeolite. The hydrofinishing can be carried out either in a fixed-bed or in an autoclave reactor. The catalyst can be either noble metal (Pd, Pt, Rh, Ru, Ir, or combination thereof) or non-noble metal (Co, Ni, Fe), particularly supported on a support such as clay, alumina, aluminosilicate, silica, titania and zirconia. The weight hourly space velocity can be in the range of 0.5 to 10 h$^{-1}$, under a hydrogen pressure in the range of ambient to 30 MPag, and a temperature from 150° C. to 400° C.

The lube product can be further fractionated to obtain desired viscosity grades. Vacuum distillation is used to obtain, for example, 4 cSt, 6 cSt, 10 cSt and intermediate and higher viscosity grades (kinematic viscosity at 100° C.). Typical columns have multiple trays (15) with internal recycle and product pump-around for 2 to 5 product draws. Following distillation, additional hydrofinishing can be used to improve stability.

EXAMPLES

Example 1

Determining Operating Conditions

The yield and selectivity of Kolbe electrolysis are determined by the reaction condition and the structure of the carboxylates. Reaction conditions were tested by varying the solvent mixture. Because properties that are ideal for electrolysis (polar) are not suitable with that required to solubilize Kolbe products (non-polar), a mixture of polar and non-polar solvent can be used. MeOH is a typical solvent used in Kolbe synthesis, since it is a superior solvent for most organic acids. The resistance of the electrolyte is high due to the low conductivity of fatty acid in methanol. Addition of a base (e.g., sodium methoxide or N,N-dimethylcyclohexylamine) generated the fatty acid salts that improve the conductivity.

The first reaction condition was selected based on an earlier presentation by Aaron Wilson, Idaho National Laboratory. The solvent comprised MeOH, hexanes (volume ratio of MeOH:hexanes was 1:1) and N,N-dimethylcyclohexylamine (20 mmole). Accordingly, the tertiary amines can act as a surfactant to solubilize the long alkane chains in a relatively polar solvent and electrolyte. They also play a role in adjusting the pH and polarity of the solution. Hexanes are used to avoid the build-up of a film on the anode. Using oleic acid in this solvent mixture, the average current in this reaction was 0.15 A at a voltage of 100V. The conversion, selectivity and current efficiency of this reaction are 60%, 85% and 70%, respectively, as shown in Table 2.

TABLE 2

Summary of selectivity and conversion for all reaction conditions (after 3 hours).

| Solvents | Conversion (%) | Selectivity (%) | Current Efficiency (%) |
|---|---|---|---|
| MeOH/hexane/amine | 60 | 85 | 70 |
| MeOH/amine | 86 | 55 | 75 |
| MeOH/sodium methoxide | 99 | 88 | 69 |
| Acetonitrile/sodium methoxide | 14 | 85 | 24 |

In the second reaction condition, MeOH was used as the main solvent and sodium methoxide as the base. This reaction condition yielded a higher current flow, an average of 0.25 A at 50V. The conversion, selectivity and current efficiency of this reaction are 99%, 88% and 69%, respectively. The improved performance could be attributed to the use of sodium methoxide which is a stronger base than amine.

Comparing the second case relative to the first, hexanes was eliminated and the amine was exchanged for sodium methoxide. To further elucidate the source of limitation of the current in our original case (MeOH, amine, hexanes), hexanes were removed from the reaction mixture (amine used as the base). The high current was maintained (average 0.2 A at 50V), leading to interpret that the presence of hexanes led to the low current. Hexanes were subsequently eliminated from the experiments described below. The conversion, selectivity and current efficiency of this reaction are 86%, 55% and 75%, respectively. Also, it was noted that in cases where precipitation of products was observed, addition of hexanes or dodecane did not appear to aid in product solubility. The solubility of the products was enhanced by keeping the reactor in a water bath held at 50° C.

Figure 5:
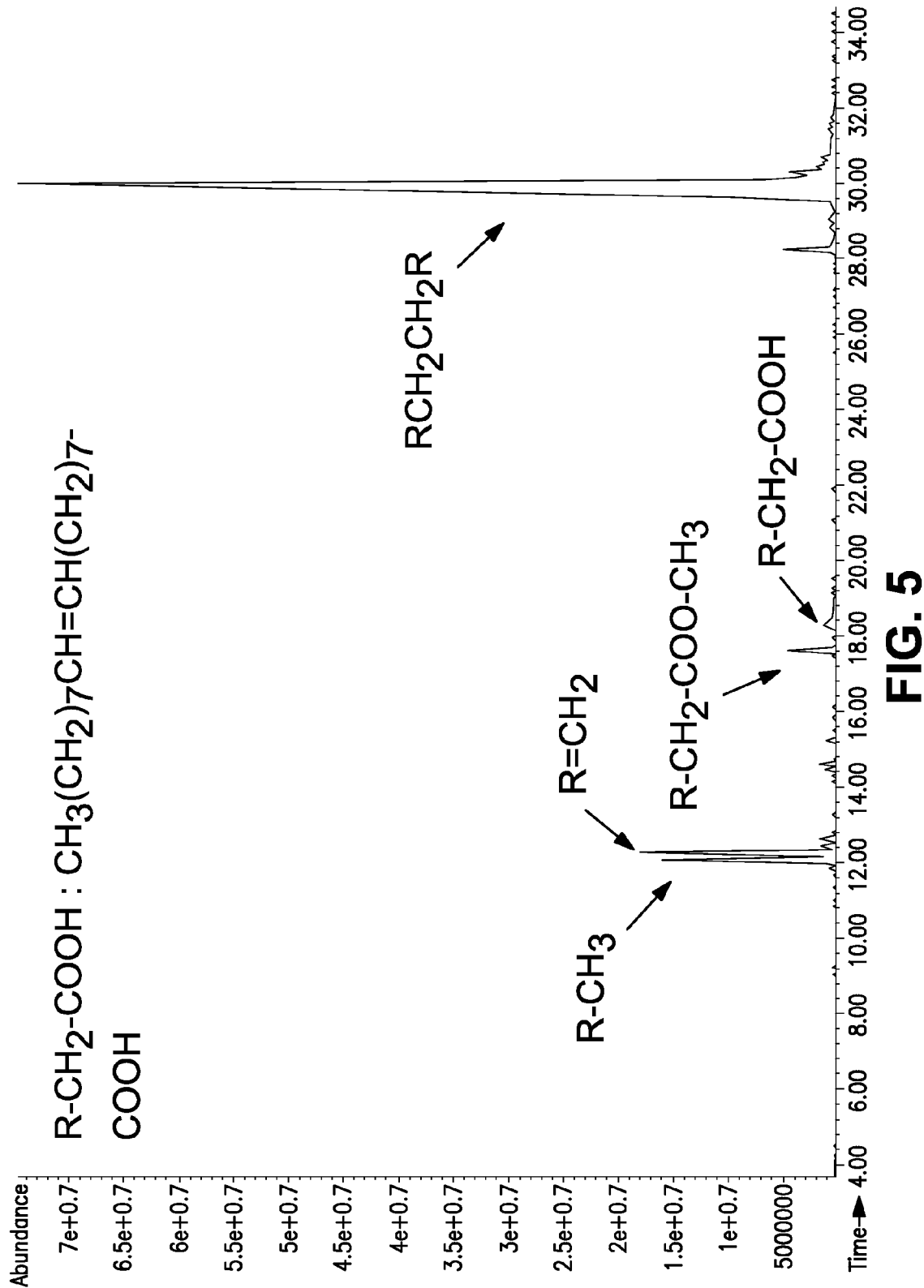
FIG. 5 is a total ion current chromatogram of Kolbe reaction products of oleic acid in MeOH/NaOMe.
Figure 6:
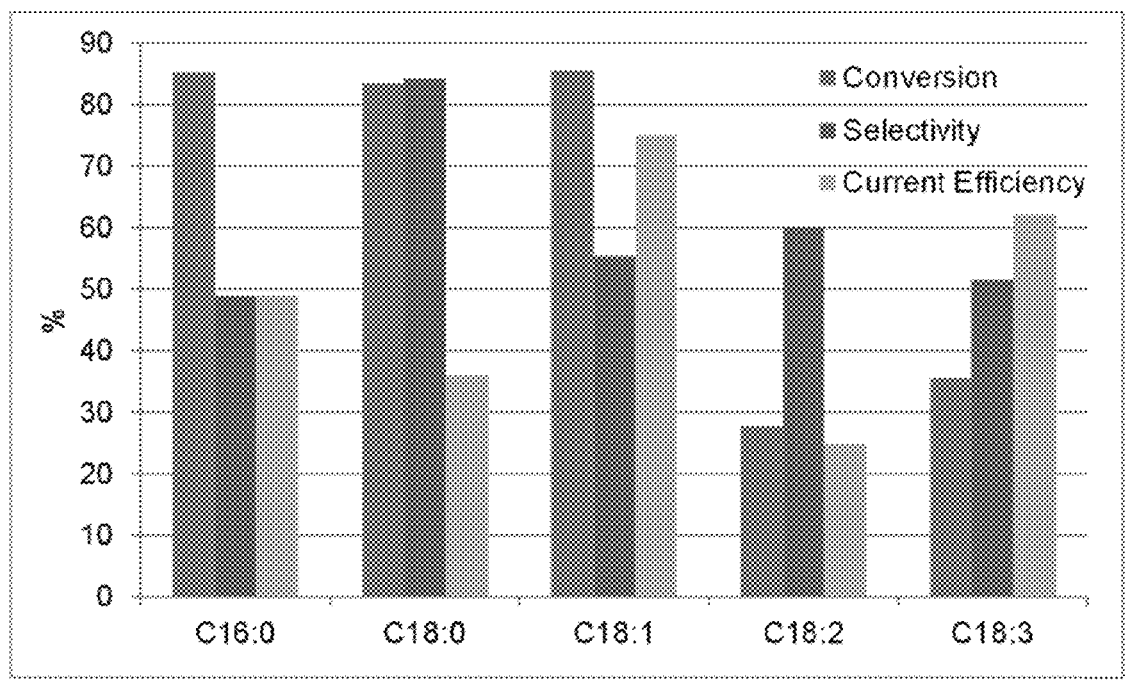
FIG. 6 is a chart showing conversion, selectivity and current efficiency of Kolbe reaction for different fatty acids.

In all of the above reactions, Kolbe electrolysis of oleic acid afforded a symmetrical dimer in a homo-coupling reaction (parent peak at m/z=474), However, by-products are often obtained—alkane (R—CH$_3$, parent peak at m/z=240) and alkene (R=CH$_2$, parent peak at m/z=238) that result from disproportionation, and transesterification product, R—CH$_2$—COO—CH$_3$ (parent peak at m/z=298) (see TIC chromatogram in FIG. 5). The acid that was converted to methyl ester (due to the presence of MeOH and base in the reaction mixture) during electrolysis evades conversion into radicals. Since a transesterification product was often observed, the main solvent MeOH was replaced with acetonitrile. A low current was observed (0.1 A at 125V), and the coupling product was detected. FAME (a common by-product) was eliminated. The conversion, however, was significantly lower. DMF has been reported to be another suitable solvent for Kolbe reaction. Exploring an alternative solvent to MeOH is important since in later experiments, triglycerides will be used as a feed in Kolbe reaction and their conversion to methyl ester should be avoided.

Example 2

Varying Degree of Unsaturation and Chain Length in Fatty Acids

The fatty acid composition in triglycerides varies in their chain length and degree of unsaturation. To investigate the effect of fatty acid structure on efficiency of Kolbe electrolysis, five different types of fatty acids (17 mmole) were used in Kolbe synthesis. They are palmitic acid (C16:0), stearic acid (C18:0), oleic acid (C18:1), linoleic acid (C18:2) and linolenic acid (C18:3), all of which are fatty acids commonly found in oils. The solvent comprised MeOH and amine.

The results suggest that the conversion and selectivity of the process is influenced by the type of acids reacted. Stearic acid appeared to give the best results in terms of both selectivity and conversion. It was noted that both saturated acids C16 and C18 gave wax-like solids that were soluble in $CS_2$. The conversion and selectivity decrease as the number of double bonds in the C18 molecule increases. For Kolbe reactions involving linoleic and linolenic acids, the current was low and polymer-like precipitates were observed. Unlike the solid products from the saturated acids, these precipitates were not soluble in $CS_2$. Elemental analysis revealed that these materials comprise mainly of carbon and hydrogen with H to C atomic ratio of 1.7 where only trace amount of N were detected.

Example 3

Electrochemical Synthesis with Fatty Acids and Aromatic Acids

The presence of aromatics in basestocks improves its solvency. An attempt was made to incorporate aromatics into fatty acids. First, to corroborate aromatic acids can undergo Kolbe coupling, phenylacetic acid was used in electrolysis (19 mmole). Homo-coupled product (parent peak at m/z=182) was observed. The conversion and selectivity of the reaction are shown in Table 3. The solvent for reactions below comprised MeOH and sodium methoxide.

TABLE 3

Summary of selectivity and conversion for Kolbe coupling involving aromatic acids (calculated based on aromatic acids).

|  | Conversion (%) | Selectivity (%) |
| --- | --- | --- |
| Phenylacetic acid | 95 | 89 |
| Phenylacetic acid + Stearic acid (1:1) | 94 | 52 |
| Phenylenediacetic acid + Stearic acid (1:10) | 89 | ~100 |
| Phenylenediacetic acid + Oleic acid (1:10) | ~100 | ~100 |
| Naphthaleneacetic acid + Stearic acid (1:10) | ~100 | 87 |

In hetero-coupling, two different acids can be co-electrolyzed. To form molecules with high solvency properties, an attempt was made to link aromatic rings to the long chain alkane. The first attempt for linking aromatics with fatty acid involved phenylacetic acid and stearic acid (mol ratio 1:1, 20 mmole of total acid). Cross-coupled product was detected (parent peak at m/z=330), making up 52% of the total amount of aromatic products. Homo-coupled products of phenylacetic acid and stearic acid were also observed. The ratio of homo- and cross-coupled products is largely determined by the relative concentration of the acids, since the intermediate radicals couple in most cases statistically. To further increase selectivity of cross-coupling, the ratio of the aromatic to fatty acid can be adjusted.

Figure 7:
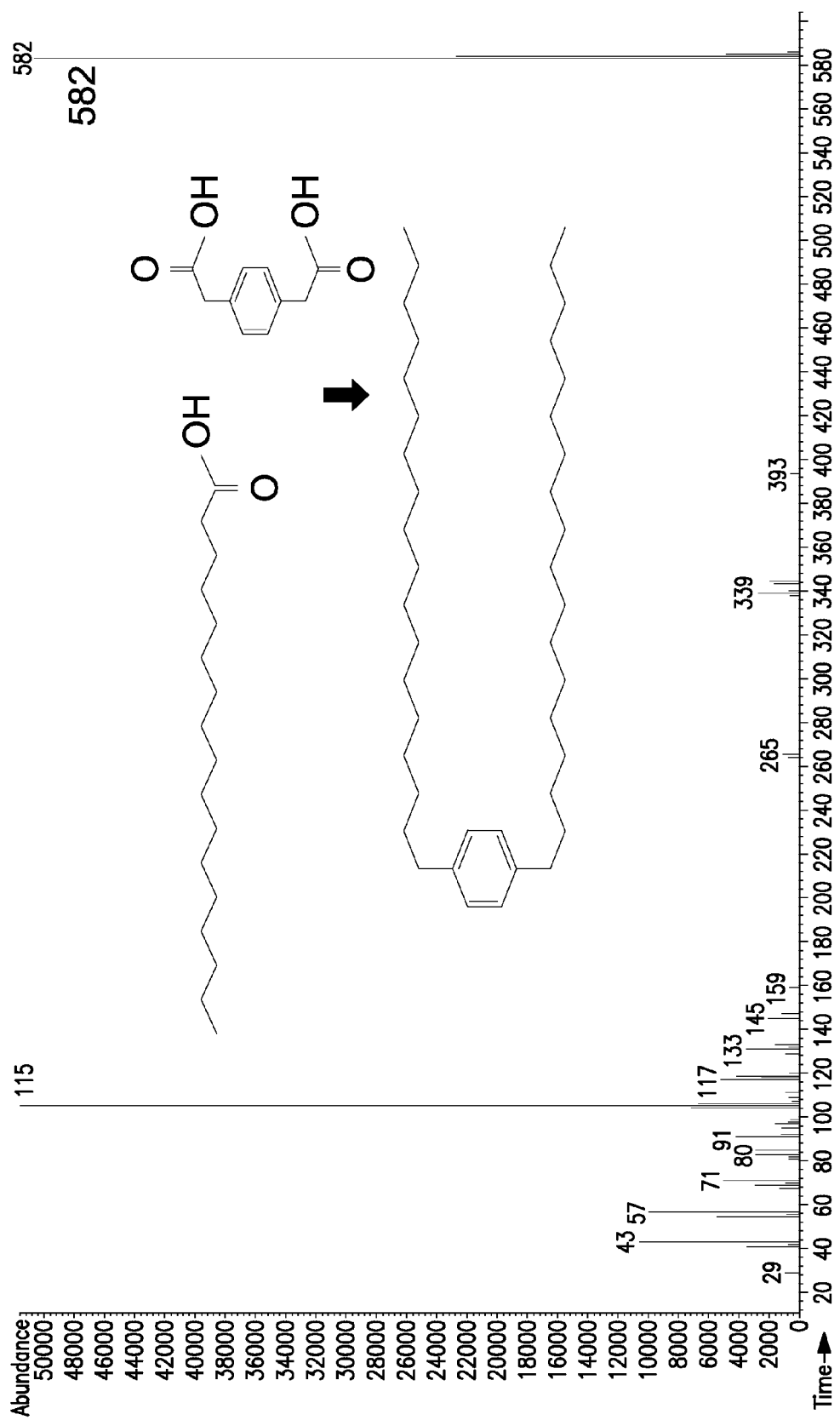
FIG. 7 is a chart showing GC/MS spectra of cross-coupled product between phenylenediacetic acid and stearic acid.

To form a long-chain di-substituted aromatic compound, phenylenediacetic acid, was co-electrolyzed with stearic acid. By taking an excess of the fatty acid, phenylenediacetic acid can be incorporated to a higher extent into the cross-coupled product (mol ratio of stearic acid:phenylenediacetic acid was 10:1; mmole of stearic acid). This will also prevent homo-coupling of phenylenediacetic acid, while the homo-coupling product of stearic acid (C34) formed in excess could be of preparative interest. Cross-coupled product of phenylenediacetic acid and stearic acid was formed and the GC/MS spectra of cross-coupled product is shown in FIG. 7 (parent peak ion at m/z=582).

Figure 8:
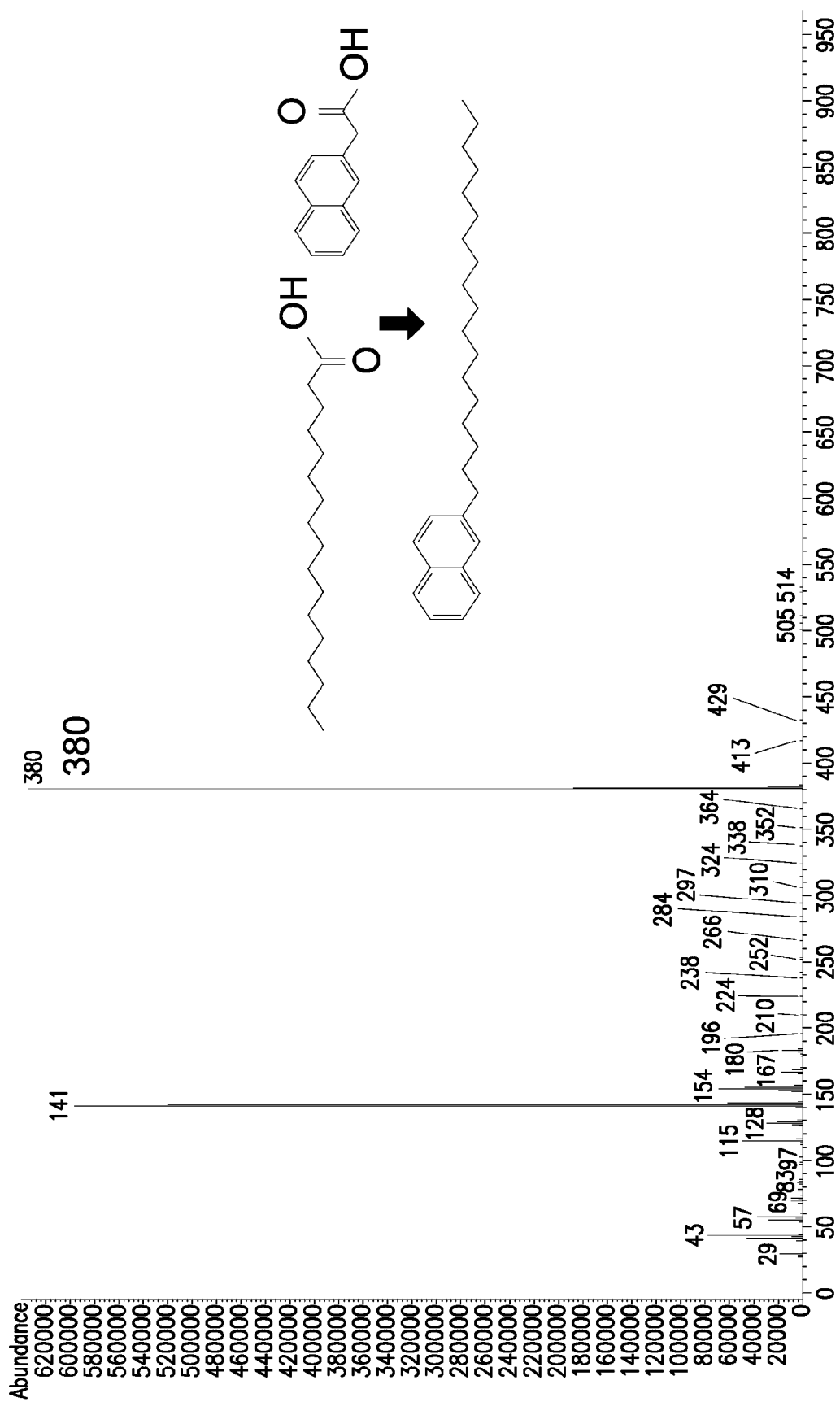
FIG. 8 is a chart showing GC/MS spectra of cross-coupled product between naphthaleneacetic acid and stearic acid.

Finally, naphthaleneacetic acid was used in co-electrolysis with stearic acid (mol ratio of stearic acid:napthaleneacetic acid was 10:1; 14 mmole of stearic acid). Cross-coupled product was detected (parent peak ion at m/z=380) and its GC/MS spectra is shown in FIG. 8. The product (an alkylated naphthalene) can be suitable for lubricant applications.

Example 4

Electrochemical Synthesis with Di/Tri-Carboxylic Acids

The electrolysis of dicarboxylic acids has potential for stepwise coupling and hence at the possibility of forming hydrocarbon oligomers since the acid molecules can grow from both ends. Kolbe reaction of sebacic acid (15 mmole) was initially performed in MeOH/sodium methoxide, giving rise to an average current of 0.5 A. However, no coupling product was observed. Based on a published literature, we increased the concentration of sebacic acid to 60 mmole and the base was replaced with amine. With the modified parameters, precipitates were observed, which was insoluble in $CS_2$. However, neither dimer nor oligomer product was detected in GC/MS.

Figure 9:
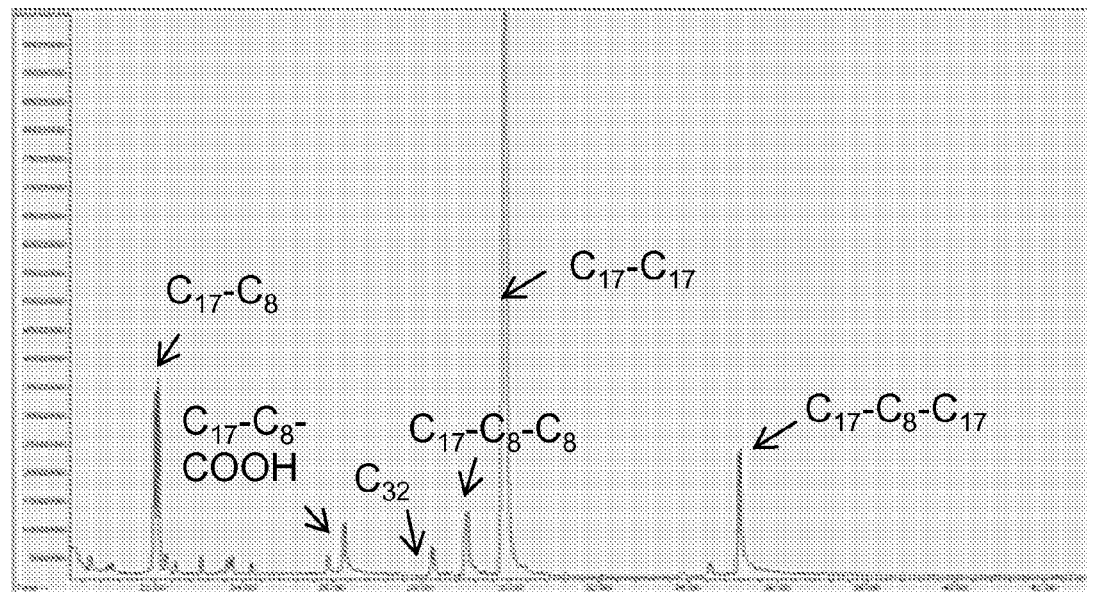
FIG. 9 is a chart showing GC/MS spectra of cross-coupled product between sebacic acid and stearic acid.
Figure 9:
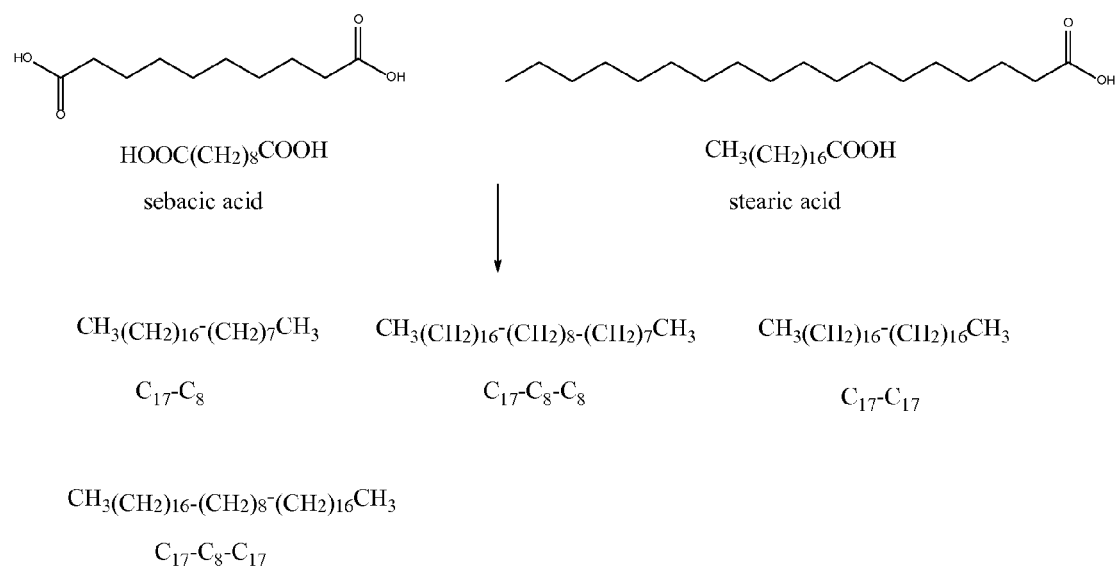

To further explore strategies to increase the molecular weight of the hydrocarbons, hetero-coupling of stearic acid with sebacic acid was tested. Co-electrolysis of sebacic acid with stearic acid was performed in MeOH/amine, at a ratio of sebacic acid to stearic acid of 1:1 (30 mmole of sebacic acid). Some cross-coupling products were detected and they are shown in FIG. 9. To investigate if it is possible to further increase the molecular weight of the cross-coupled product, the ratio of sebacic acid to stearic acid was changed to 1:5. However, no products heavier than the $C_{17}$-$C_8$-$C_{17}$ couple were detected. Co-electrolysis of sebacic acid with naphthaleneacetic acid (mole ratio 5:1) gave cross-coupling product that comprise of C16 (from two sebacic acids) and one naphthalene group (from naphthaleneacetic acid).

Example 5

Electrochemical Synthesis with Triglycerides

A one-pot conversion of triglycerides to coupled products of carboxylic acids was tested. Since hydrolysis of triglycerides is catalyzed by base and Kolbe reaction is conducted in a slightly alkaline condition, tests were made to see whether both reactions can be conducted in one step. If successful, this chemistry can provide an entry to a variety of large organic molecules that can be converted to basestocks and waxes.

Triolein was used for the tests. Conceptually, hydrolysis of triolein must precede Kolbe reaction to release free fatty acids for decarboxylation. As an initial step, step-wise approach was taken. This was achieved by adding NaOH and water into triolein and incubating them at 70° C. overnight. The resulting oil phase was neutralized with dilute HCl to liberate the acids and rinsed with copious amount of water to remove excess salts. The fatty acid was then extracted using diethyl ether, and the diethyl ether was removed via rotorvap. Trace amount of water that remained (droplets) was removed by leaving the oil phase in a vacuum oven overnight.

After overnight hydrolysis, oleic acid was detected in GC/MS. Kolbe electrolysis was carried out on this sample using MeOH and sodium methoxide for 2.5 hours. Although the coupling product was detected, a lot of FAME was present (90% of the product). This is accompanied by the disappearance of the peak for triolein, suggesting that most of the TG was esterified to form the FAME in the process.

It is important to note that the hydrolysis process should not be done in the presence of MeOH. The presence of MeOH and/or use of sodium methoxide as base in the hydrolysis process led to the formation of FAME (methyl oleate) instead of oleic acid. It is noted that Kolbe reaction of methyl oleate in the presence of minute amount of water has been attempted. While current was observed, no coupling product was detected. This suggests that the presence of a tiny amount of water in the oil phase led to electrolysis of water, competing with decarboxylation of fatty acids. Therefore, care was taken to ensure removal of water prior to Kolbe reactions.

PCT and EP Clauses:

1. A method for producing a lube basestock or wax from a feedstock of biological origin, the method comprising: providing a fatty acid originated from the feedstock of biological origin and an aromatic acid in a solvent comprising a base; and electrochemically coupling the fatty acid and the aromatic acid to produce a hydrocarbon, wherein the molar concentration of the fatty acid is greater than the molar concentration of the aromatic acid.

2. A method for producing a lube basestock or wax from a feedstock of biological origin in a single reactor, the method comprising: hydrolyzing a triglyceride in the feedstock of biological origin to one or more fatty acids in the presence of water, wherein the amount of the water is controlled to be substantially consumed during the hydrolyzing reaction; and electrochemically coupling the fatty acids in a solvent comprising a base to produce a hydrocarbon, wherein the base is provided not to be mixed with the triglyceride in the hydrolyzing reaction.

3. A method for producing a lube basestock or wax from a feedstock of biological origin, the method comprising: providing a fatty acid and a carboxylic acid selected from the group consisting of malonic acid, succinic acid, glutaric acid, adipic acid, pimelic acid, suberic acid, sebacic acid, citric acid, isocitric acid, aconitic acid, propane-1,2,3-tricarboxylic acid, and trimesic acid; and electrochemically coupling acids to produce a hydrocarbon, wherein a molar ratio of the carboxylic acid to the fatty acid is in a range of 1:5 to 1:20.

4. The method of any of the clauses above, further comprising hydrolyzing a triglyceride originated from the feedstock of biological origin to produce a fatty acid.

5. The method of any of the clauses above, further comprising hydroisomerizing or cracking the hydrocarbon to produce lube basestock.

6. The method of any of the clauses above, wherein the feedstock of biological origin is selected from the group consisting of rapeseed oil, soy bean oil, palm oil, camelina oil, jatropha oil, jojoba oil, fish oil, lard, beef tallow, and algae oil.

7. The method of any of the clauses above, wherein the fatty acid includes caprylic acid, capric acid, lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, α-Linolenic acid, arachidonic acid, eicosapentaenoic acid, erucic acid, docosahexaenoic acid or a mixture thereof.

8. The method of any of the clauses above, wherein the fatty acid includes lauric acid, myristic acid, palmitic acid, stearic acid, arachidic acid or a mixture thereof.

9. The method of any of the clauses above, wherein the aromatic acid includes phenylacetic acid, phenylenediacetic acid, naphthaleneacetic acid, 1,4-naphthalenedicarboxylic acid, 2,3-naphthalenedicarboxylic acid, 2,6-naphthalenedicarboxylic acid or a mixture thereof.

10. The method of any of the clauses above, wherein the aromatic acid includes phenylacetic acid, phenylenediacetic acid, naphthaleneacetic acid or a mixture thereof.

11. The method of any one of clauses 1 and 4-10, wherein a molar ratio of the aromatic acid to the fatty acid is in a range of 1:5 to 1:20.

12. The method of clause 11, wherein a molar ratio of the aromatic acid to the fatty acid is in a range of 1:7 to 1:13.

13. The method of any of the clauses above, wherein the solvent comprises methanol, hexane, acetonitrile, dimethylformamide, 4-methylmorpholine or a mixture thereof.

14. The method of clause 13, wherein the base is sodium methoxide or amine.

15. The method of clause 13, wherein the solvent comprises methanol and sodium methoxide.

16. The method of clause 13, wherein the solvent comprises methanol and N,N-dimethylcyclohexylamine.

17. The method of any of the clauses above, wherein the coupling is carried out by applying direct current (DC).

18. The method of any of the clauses above, wherein the coupling is carried out by reversing voltage of the DC during the electrochemical coupling process.

All documents described herein are incorporated by reference herein, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. Likewise, the term "comprising" is considered synonymous with the term "including" for purposes of Australian law.

When numerical lower limits and numerical upper limits are listed herein, ranges from any lower limit to any upper limit are contemplated.

While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

What is claimed is:

1. A method for producing a lube basestock or wax from a feedstock of biological origin, the method comprising:
   providing a fatty acid originated from the feedstock of biological origin and a di- or tri-carboxylic acid in a solvent comprising a base; and
   electrochemically coupling the fatty acid and the di- or tri-carboxylic acid to produce a lube basestock or wax, wherein the molar concentration of the fatty acid is greater than the molar concentration of the di- or tri-carboxylic acid.

2. The method of claim 1, further comprising hydrolyzing a triglyceride originated from the feedstock of biological origin to produce a fatty acid.

3. The method of claim 1, further comprising hydroisomerizing or cracking the lube basestock or wax.

4. The method of claim 1, wherein the feedstock of biological origin is selected from the group consisting of rapeseed oil, soy bean oil, palm oil, camelina oil, jatropha oil, jojoba oil, fish oil, lard, beef tallow, and algae oil.

5. The method of claim 1, wherein the fatty acid includes caprylic acid, capric acid, lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, α-Linolenic acid, arachidonic acid, eicosapentaenoic acid, erucic acid, docosahexaenoic acid or a mixture thereof.

6. The method of claim 1, wherein the fatty acid includes lauric acid, myristic acid, palmitic acid, stearic acid, arachidic acid or a mixture thereof.

7. The method of claim 1, wherein the di-carboxylic acid includes phenylenediacetic acid, 1,4-naphthalenedicarboxylic acid, 2,3-naphthalenedicarboxylic acid, 2,6-naphthalenedicarboxylic acid or a mixture thereof.

8. The method of claim 1, wherein a molar ratio of the di- or tri-carboxylic acid to the fatty acid is in a range of 1:5 to 1:20.

9. The method of claim 1, wherein a molar ratio of the di- or tri-carboxylic acid to the fatty acid is in a range of 1:7 to 1:13.

10. The method of claim 1, wherein the solvent comprises methanol, hexane, acetonitrile, dimethylformamide, 4-methylmorpholine or a mixture thereof.

11. The method of claim 1, wherein the base is sodium methoxide or amine.

12. The method of claim 1, wherein the solvent comprising a base comprises methanol and sodium methoxide.

13. The method of claim 1, wherein the solvent comprising a base comprises methanol and N,N-dimethylcyclohexylamine.

14. The method of claim 1, wherein the electrochemically coupling is carried out by applying direct current (DC).

15. The method of claim 14, wherein the electrochemically coupling is carried out by reversing voltage of the DC during the electrochemical coupling process.

16. A method for producing a cross-coupled lube basestock or wax from a feedstock of biological origin, the method comprising:

providing a fatty acid and a di- or tri-carboxylic acid selected from the group consisting of malonic acid, succinic acid, glutaric acid, adipic acid, pimelic acid, suberic acid, sebacic acid, citric acid, isocitric acid, aconitic acid, propane-1,2,3-tricarboxylic acid, and trimesic acid in a solvent comprising a base; and electrochemically coupling the di- or tri-carboxylic acid with the fatty acid to produce a cross-coupled lube basestock or wax, wherein a molar ratio of the di- or tri-carboxylic acid to the fatty acid is in a range of 1:5 to 1:20.

17. The method of claim 16, wherein the solvent comprises methanol, hexane, acetonitrile, dimethylformamide, 4-methylmorpholine or a mixture thereof.

18. The method of claim 16, wherein the base is sodium methoxide or amine.

19. The method of claim 16, wherein the solvent comprising a base comprises methanol and sodium methoxide.

20. The method of claim 16, wherein the solvent comprising a base comprises methanol and N,N-dimethylcyclohexylamine.

* * * * *